(12) United States Patent
Barton

(10) Patent No.: US 11,262,186 B2
(45) Date of Patent: Mar. 1, 2022

(54) PRODUCTS AND PROCESSES FOR MEASURING THE SURFACE PROFILE OF A CROP OR PASTURE

(71) Applicant: Farmote Limited, Hamilton (NZ)

(72) Inventor: Richard Athol Barton, Hamilton (NZ)

(73) Assignee: Farmote Limited, Hamilton (NZ)

(*) Notice: Subject to any disclaimer, the term of this patent is extended or adjusted under 35 U.S.C. 154(b) by 70 days.

(21) Appl. No.: 16/606,104

(22) PCT Filed: Apr. 20, 2018

(86) PCT No.: PCT/NZ2018/050054
§ 371 (c)(1),
(2) Date: Oct. 17, 2019

(87) PCT Pub. No.: WO2018/194464
PCT Pub. Date: Oct. 25, 2018

(65) Prior Publication Data
US 2020/0049491 A1 Feb. 13, 2020

(30) Foreign Application Priority Data

Apr. 21, 2017 (NZ) ........................................ 731233

(51) Int. Cl.
*G01B 11/245* (2006.01)
*G01S 17/89* (2020.01)
(Continued)

(52) U.S. Cl.
CPC ............ *G01B 11/00* (2013.01); *G01B 11/026* (2013.01); *G01B 11/245* (2013.01); *G01S 7/497* (2013.01); *G01S 17/89* (2013.01); *G01B 2210/58* (2013.01)

(58) Field of Classification Search
CPC ... G01B 11/026; G01B 11/0608; G01B 11/00; G01B 11/245; G01B 5/0035;
(Continued)

(56) References Cited

U.S. PATENT DOCUMENTS 5,509,486 A * 4/1996 Anderson ............ A01B 69/008
172/5
6,389,785 B1 * 5/2002 Diekhans ............. A01B 69/001
56/10.2 F
(Continued)

FOREIGN PATENT DOCUMENTS

| CN | 102088839 A | 6/2011 |
|---|---|---|
| CN | 204831204 A | 12/2015 |
| CN | 204831204 U | 12/2015 |

OTHER PUBLICATIONS

Tilly N., "Multitemporal crop surface models: accurate plant height measurements and biomass estimation with terrestrial laser scanning in paddy rice", Journal of Applied Remote Sensing, vol. 8 2014, published Mar. 6, 2014, pp. 083671-1-083671-22.

(Continued)

*Primary Examiner* — Sang H Nguyen
(74) *Attorney, Agent, or Firm* — Leydig, Voit & Mayer, Ltd.

(57) ABSTRACT

Products and processes for measuring crop and pasture surface profile which may be used to measure the average surface profile of crop and pasture foliage around stationary measurement devices.

20 Claims, 22 Drawing Sheets

(51) Int. Cl.
  *G01B 11/02* (2006.01)
  *G01S 7/497* (2006.01)
  *G01B 11/00* (2006.01)

(58) Field of Classification Search
  CPC ..... G01B 2210/58; G01S 17/88; G01S 7/497; G01S 17/89; A01B 79/005; G01C 7/00
  See application file for complete search history.

(56) References Cited

U.S. PATENT DOCUMENTS

| | | | |
|---|---|---|---|
| 2003/0004630 A1* | 1/2003 | Beck | A01D 41/127 701/50 |
| 2015/0015697 A1* | 1/2015 | Redden | G06K 9/6202 348/89 |
| 2015/0354943 A1* | 12/2015 | Posselius | G01S 1/00 701/50 |
| 2016/0084635 A1 | 3/2016 | Pittman et al. | |
| 2018/0271016 A1* | 9/2018 | Milano | A01D 75/00 |
| 2019/0170860 A1* | 6/2019 | Burke | G01S 7/4808 |

OTHER PUBLICATIONS

Ehlert et al., "Laser rangefinder-based measuring of crop biomass under field conditions," *Precision Agriculture*, 10(5): 395-408 (Mar. 26, 2009).

Tilly et al., "Multitemporal crop surface models: accurate plant height measurement and biomass estimation with terrestrial laser scanning in paddy rice," *J. of Applied Remote Sensing*, 8(1): 083671 (Mar. 6, 2014).

Tilly et al., "Fusion of plant height and vegetation indices for the estimation of barley biomass," *Remote Sensing*, 7(9): 11449-11480 (Sep. 9, 2015).

European Patent Office, Extended European Search Report in European Patent Application No. 18787920.0, 11 pp. (dated Nov. 20, 2020).

The International Bureau of WIPO, International Preliminary Report on Patentability in International Patent Application No. PCT/NZ2018/050054, 7 pp. (dated Oct. 22, 2019).

Australian Patent Office, International Search Report in International Patent Application No. PCT/NZ2018/050054, 4 pp. (dated Aug. 3, 2018).

* cited by examiner

DETAIL A

PRODUCTS AND PROCESSES FOR MEASURING THE SURFACE PROFILE OF A CROP OR PASTURE

CROSS-REFERENCE TO RELATED APPLICATIONS

This United States application is the National Phase of PCT Application No. PCT/NZ2018/050054 filed 20 Apr. 2018, which claims priority to New Zealand Applications No. 731233 filed 21 Apr. 2017, each of which is incorporated herein by reference.

BACKGROUND OF THE INVENTION

Technical Field

The invention relates to products and processes for measuring crop and pasture surface profile. In preferred embodiments the products and processes of the invention may be used to measure the average surface profile of crop and pasture foliage around stationary measurement devices.

Background Art

Research has shown that there is an ideal range for the amount of pasture in a paddock to maximize grass growth—and this amount can be measured simply as pasture height, but can also be measured in kilograms of dry matter (typically grass and clover once all the water has been removed) per hectare.

The only direct way to measure the dry matter is to cut a sample area, dry the foliage in an oven and then weigh the result. In practice this is rarely used due to the time involved.

Instead, farmers deduce this value using other means. These include: dropping a round disc of a certain weight onto a pasture and measuring how far off the ground it comes to rest, using an ultrasonic sensor attached to either a moving vehicle or a walking stick, or dragging an arched array of light emitters (like those used in a machine guard) through the pasture to detect the grass height.

It is estimated that dairy farmers, in particular, typically spend 2-4 hours per week measuring the amount of pasture they have available so that they can optimise the rotation of their cows through the different paddocks to maximise total pasture growth.

It would be advantageous if the amount of crop or pasture could be determined accurately without the need to resort to the time-consuming methods presently used.

It is an object of the present invention to address one or more of the foregoing problems or at least to provide the public with a useful choice.

SUMMARY OF THE INVENTION

In a first aspect the present invention provides a device for measuring the surface profile of the canopy of a crop or pasture growing on a substrate, the device including a sensor member coupled to a support member that is configured to detachably mount to the substrate, wherein the support member is configured to:

i) space the sensor member above the substrate by a first distance; and ii) space the sensor member above the canopy of the crop or pasture by a second distance;

and wherein the sensor member:

i) includes a light transmission member that is configured to transmit light which is reflected by the canopy of the crop or pasture; and ii) includes a light detection sensor that is configured to detect at least a portion of the light transmitted from the light transmission member that is reflected by the canopy of the crop or pasture so as to enable the measurement of the surface profile of the canopy of the crop or pasture.

By measuring the surface profile of the canopy of the crop or pasture surrounding the device, it is believed to be possible to calculate the following values:

crop or pasture height;
crop or pasture density;
crop or pasture metabolizable energy (ME); and/or
crop or pasture dry mass content.

The sensor member may include a plurality of light transmission members, such as a multitude of light transmission members. In those instances where the sensor member includes a plurality of light transmission members, the light transmission members may be oriented in different directions. For example, the plurality of light transmission members may be oriented to transmit light radially outwardly and towards the substrate from the sensor member. The or each light transmission member may transmit light radially outward from the sensor member at a known angle to the vertical, horizontal, average slope of the substrate and/or average slope of the canopy of the crop or pasture. The device may include a multitude of light transmission members in rows and at different angles so as to transmit light radially outward from the sensor member at a range of angles to the vertical, horizontal, average slope of the substrate and/or average slope of the canopy of the crop or pasture The sensor member may include a plurality of light detection sensors, such as a multitude of light detection sensors.

In some embodiments, the sensor member may include an integrated unit that integrally includes both a light transmission member and a light detection sensor. The sensor member may include a plurality of such integrated units, such as a multitude of light transmission members. Advantageously, there are a number of such integrated units readily available off-the-shelf.

The substrate will typically be the ground in which the crop or pasture is growing.

At its simplest level, the device may be used to measure the surface profile of the canopy of the crop or pasture above the substrate by determining the difference between the first distance and the second distance. In some embodiments the first distance will be predetermined by the dimensions of the support member which spaces the sensor member above the substrate by the first distance. In some embodiments the second distance will be determined by transmitting light from the sensor member in the direction of the location that the support member is detachably mounted to the substrate and detecting at least a portion of the light transmitted from the light transmission member that is reflected by the canopy of the crop or pasture. The time taken for the light that is transmitted to be detected can be used to determine the distance, particularly where the light is assumed to move at the speed of light in a vacuum (approximately $3.00 \times 10^8$ m/s), using the following equation:

$$d_2 = t/2 \times 3.00 \times 10^8$$

Where:

d₂=second distance (m)

t=time taken for the light that is transmitted to be detected (s)

This information may then be used to determine the crop or pasture height as the difference between the first distance and the second distance.

The invention is capable of more sophisticated application as described herein below.

In some embodiments, the device itself may include a processing means (processor) that is capable of calculating the profile of the canopy of the crop or pasture. The processing means may further process the information provided by the transmission and detection of light by the sensor member, such as by determining the difference between the first distance and the second distance.

In other embodiments, the device may be in communication with a separate processing means, which may be located in a base station. The processing means may be located in an information server, such as a central computer. The device may also include a data storage member for storing the data.

The data may be:
  wirelessly transmitted to the base station for analysis;
  wirelessly transmitted to an intermediate master unit, and then transmitted from the master unit to a base station. Such a mode of communication may be particularly preferred so as to reduce power load on the device(s). For instance, daughter device(s) may wirelessly communicate with a master unit by Bluetooth, Wide Area Network (WAN; including LPWAN such as LoRaWAN), Wireless Local Area Network (WLAN), Wi-Fi, and/or mobile telephony (such as GSM and UMTS). Preferably the daughter device(s) communicate with a master unit using a low power communication mode such as Bluetooth. The master unit can then communicate with a base station (such as information server, such as central computer) using a longer range, potentially high-power communication mode, such as LoRaWAN;
  the data may be retrieved by plugging in a data connection to the device (wired communication) to connect a laptop or smartphone, for example; or
  The data may be retrieved by wirelessly connection to the device (wireless communication) to connect a laptop or smartphone, for example.

The device may also include an algorithm as part of the software which sends alerts when the values of crop or pasture height; crop or pasture density; and/or crop or pasture dry mass content get above or below predetermined limits.

In a second aspect the present invention provides a system for measuring the surface profile of the canopy of a crop or pasture growing on a substrate, the system including:
  a) a device for measuring the surface profile of the canopy of a crop or pasture growing on a substrate, the device including a sensor member coupled to a support member that is configured to detachably mount to the substrate, wherein the support member is configured to:
    i) space the sensor member above the substrate by a first distance; and
    ii) space the sensor member above the canopy of the crop or pasture by a second distance;
  and wherein the sensor member:
    i) includes a light transmission member that is configured to transmit light which is reflected by the canopy of the crop or pasture; and
    ii) includes a light detection sensor that is configured to detect at least a portion of the light transmitted from the light transmission member that is reflected by the canopy of the crop or pasture so as to enable the measurement of the surface profile of the canopy of the crop or pasture; and
  b) a processing means separate from the device.

Generally the system will include a plurality of devices for measuring the surface profile of the canopy of a crop or pasture growing on a substrate. Typically the system will include a multitude of devices for measuring the surface profile of the canopy of a crop or pasture growing on a substrate.

In a third aspect the present invention provides an array of devices for measuring the surface profile of the canopy of the crop or pasture over a multitude of areas, the array including a multitude of devices for measuring the surface profile of the canopy of a crop or pasture growing on a substrate, each of the multitude of devices independently including a sensor member coupled to a support member that is configured to detachably mount to the substrate, wherein the support member is configured to:
  i) space the sensor member above the substrate by a first distance; and
  ii) space the sensor member above the canopy of the crop or pasture by a second distance;
  and where the sensor member includes a sensor configured to detect light transmitted from the sensor member so as to enable the measurement of the surface profile of the canopy of the crop or pasture.

The devices in the array may provide overlapping regions of measurement.

In a fourth aspect the present invention provides a method of measuring the surface profile of the canopy of a crop or pasture growing on a substrate, the method including the steps of:
  i) providing a sensor member including:
    a) a light transmission member that is configured to transmit light; and
    b) a light detection sensor;
  ii) transmitting light from the light transmission member so that the light is reflected by the canopy of the crop or pasture;
  iii) detecting at least a portion of the transmitted light that is reflected by the canopy of the crop or pasture using the light detection sensor; and
  iv) calculating the spatial relationship between the sensor member and the canopy of the crop or pasture.

The method of the invention may further include calibration step(s) to determine the spatial relationship between the sensor member and the substrate. For example, the calibration step(s) may involve providing the sensor member at a predetermined distance from the substrate. In one embodiment, the predetermined distance from the substrate may be provided by spacing the sensor member above the substrate by a first distance. The spacing may be provided by a support member of fixed dimensions. In another example, the calibration step(s) may be provided by measuring the profile of the substrate before a crop or pasture is grown on the substrate. In one embodiment, the calibration step(s) may include:
  i) providing a sensor member including:
    a) a light transmission member that is configured to transmit light; and
    b) a light detection sensor;
  ii) transmitting light from the light transmission member so that the light is reflected by the substrate;

iii) detecting at least a portion of the transmitted light that is reflected by the substrate using the light detection sensor; and iv) calculating the spatial relationship between the sensor member and the substrate.

Accordingly, the invention provides a method of measuring the surface profile of the canopy of a crop or pasture growing on a substrate, the method including the steps of:
i) providing a sensor member including:
   a) a light transmission member that is configured to transmit light; and
   b) a light detection sensor;
ii) transmitting light from the light transmission member so that the light is reflected by the substrate;
iii) detecting at least a portion of the transmitted light that is reflected by the substrate using the light detection sensor;
iv) calculating the spatial relationship between the sensor member and the substrate;
v) transmitting light from the light transmission member so that the light is reflected by the canopy of the crop or pasture;
vi) detecting at least a portion of the transmitted light that is reflected by the canopy of the crop or pasture using the light detection sensor; and
vii) calculating the spatial relationship between the sensor member and the canopy of the crop or pasture.

BRIEF DESCRIPTION OF THE DRAWINGS

Further aspects of the present invention will become apparent from the ensuing description which is given by way of example only and with reference to the accompanying drawings in which.

DETAILED DESCRIPTION OF THE INVENTION

Figure 1:
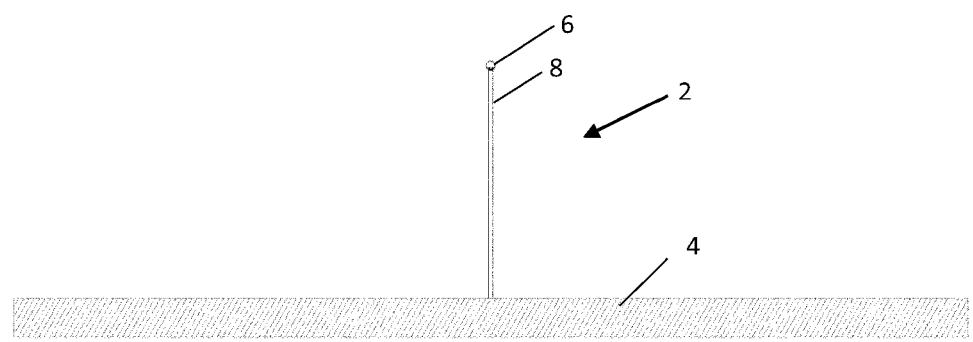
FIG. 1 shows a side view of a device of the invention mounted to a substrate.

It is envisioned that the invention could also be used on a wide variety of crops (such as wheat and maize) and pastures. The invention may be used in relation to agricultural or horticultural crops, including both harvested and grazed crops and pastures, such as pastures used to graze domesticated animals. For example the invention may be used in relation to grass based pastures used for cattle and sheep.

The invention may be used in combination with other sensors to detect critical crop management points. For example, when the crop suffers an attack of pests or diseases, or when it changes from the vegetative to the reproductive growth phases the products and methods of the invention may be used to remotely monitor such changes.

The invention may use any form of light, however preferably the light may be a coherent light source such as that emitted from a LASER source. For example, the sensor may be a laser ranging sensor, such as a time-of-flight ranging sensor. In some embodiments the laser is a Vertical Cavity Surface-Emitting Laser (VCSEL). Advantageously such sensors may be found in a fully integrated miniature module, a number of which are currently commercially available. In some embodiments the light source is a LASER source operating at a wavelength of 940 nm. While the invention may utilize light in the visible spectrum, it is preferable to use light outside the visible spectrum, particularly where grazing animals may be disturbed by the visibility of the light.

The measurements may be taken using a Time-of-flight (ToF) sensor. Such a sensor may emit a cone (or similar, such as prism or pyramid) of light (such as infra-red laser light) called the field of view and then detects the reflections back from objects inside the sensing area (field of view). The cone of light may be emitted using a scanning laser or an optical lens. Preferably the cone of light is provided using an optical lens, so that the entire field of view is illuminated by the laser simultaneously. The sensor can embed timing information in the light as it is emitted and then measures this in the detected light. In some embodiments, the light can provide a digital signal by means of a pulse-width modulated (PWM) signal.

By calculating the time taken from when the light (with embedded information and/or PWM signal) was emitted to when it was detected it can deduce the distance (as the speed of light in air is known)—hence the name Time-of-flight. There are number of different sensors of this type available, including the VL53L family from ST Microelectronics.

In preferred embodiments the sensor member includes a Time-of-flight (ToF) sensor. In particularly preferred embodiments the sensor member includes a plurality of ToF sensors.

In some embodiments the detector array within the sensor member may be fragmented (into 4 or more, such as 9, such as 16, regions for example), allowing for the measurement of multiple surface profiles of the canopy of a crop or pasture growing on a substrate within the corresponding fragmented field of view. The information obtained from such a fragmented field of view may allow for more accurate modelling of the overall surface profile of the canopy within the entire field of view.

The support member may be made of a variety of materials and dimensions. The support member may be any solid or substantially solid fixed component that is taller than the crop at the time of measurement and is configured to detachably mount to the substrate. Typically the support member will be an elongate member such as a pole or beam. In one embodiment the support member is a circular pole with one end inserted into the soil to fix it in position. For example, the support member may be an essentially straight rigid pole or stake that is configured to detachably mount to the substrate. Such mounting may be provided by the pole or stake being rammed into the substrate. The support member may be substantially rigid. In such embodiments, it may be preferable to provide the support member with a resilient base member so that the support member may be deflected from its normal resting orientation, such as by passing animals, and yet return to its normal resting orientation, or close to that orientation. Such resilient base members may incorporate a spring and/or fibreglass.

In some embodiments the support member is configured to allow the sensor member to move between a plurality of different positions. For example, the sensor member may move up and down the support member and may measure the surface profile of the canopy of the crop or pasture growing on the substrate from a plurality of positions, where the positions may space the sensor member above the substrate by different distances. By way of further example, the support member itself may alter in dimensions so that the sensor member may move up and down, such as through the use of a telescoping support member.

In preferred embodiments, the device will also include an angle detection member that is configured to detect the angle from vertical of the device. An example of such an angle detection member is an accelerometer.

In some embodiments, the sensor member will measure a multitude of distances to all objects in the field of view to provide a distribution of distances. This distribution may undergo a number of statistical manipulations to provide useful data to the user. For example, an average distance to all the objects in the field of view may be calculated. The statistical manipulation may involve ignoring certain outlying distances (such as high and low points) to provide a more representative approximation of the surface profile of the canopy.

Using the distance to the objects in the field of view, the measured vertical angle, the first distance and the known angle from the pole to the centre of the detector array of the sensor—an average surface profile (and hence height) of the foliage can be calculated.

Figure 10:
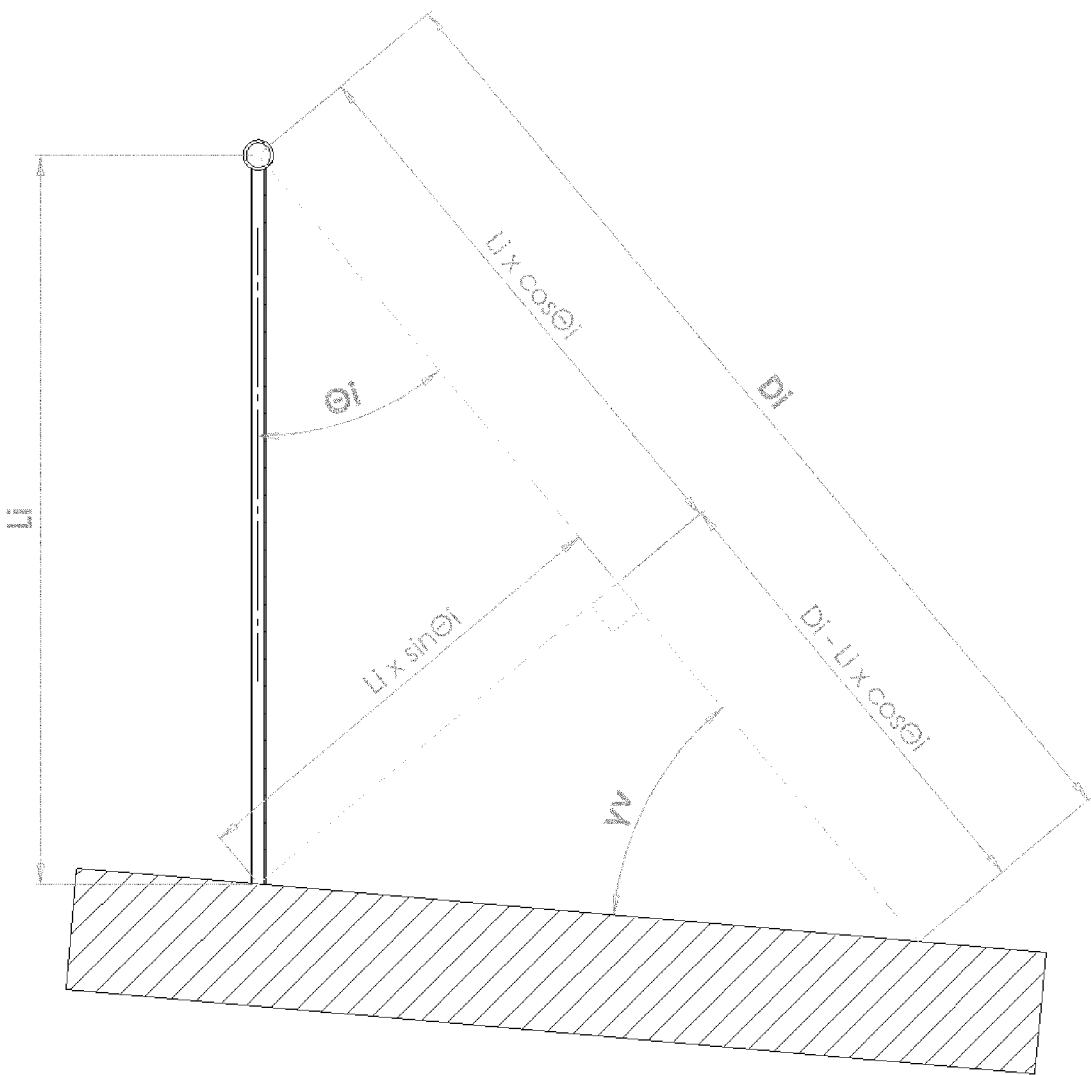
FIG. 10 shows a side view of a device of the invention that is mounted vertically, showing mathematical variables useful for measuring the surface profile of the canopy of a crop or pasture growing on a substrate.
Figure 11:
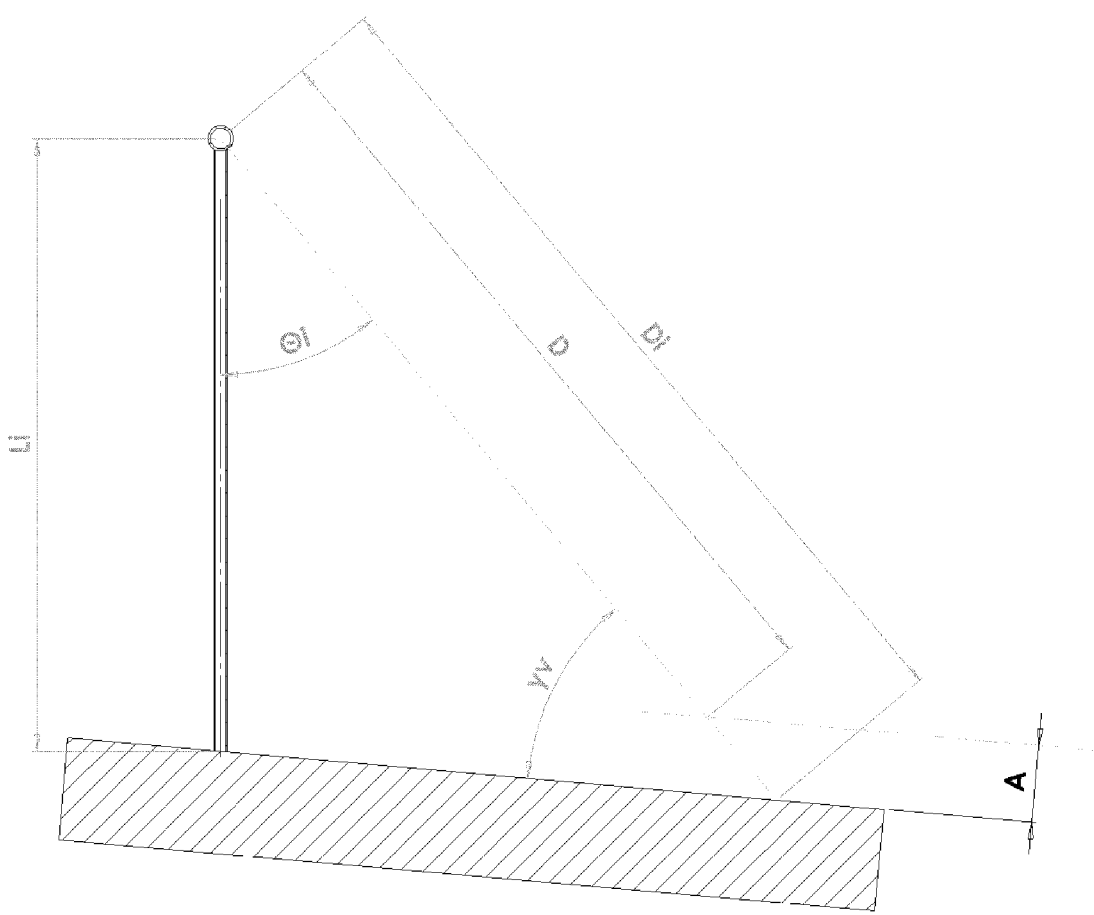
FIG. 11 shows a side view of a device of the invention that is mounted vertically, showing mathematical variables useful for measuring the surface profile of the canopy of a crop or pasture growing on a substrate.
Figure 12:
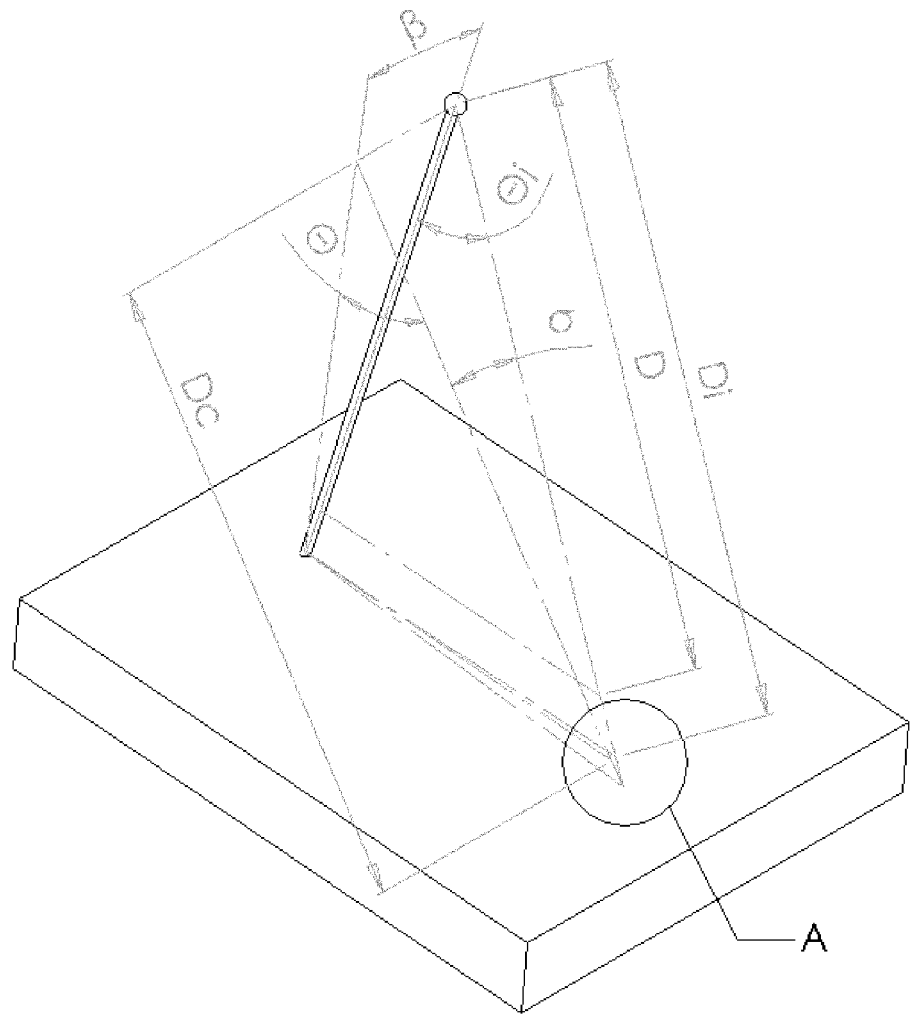
FIG. 12 shows a perspective view of a device of the invention that is not mounted vertically, showing mathematical variables useful for measuring the surface profile of the canopy of a crop or pasture growing on a substrate.
Figure 12:
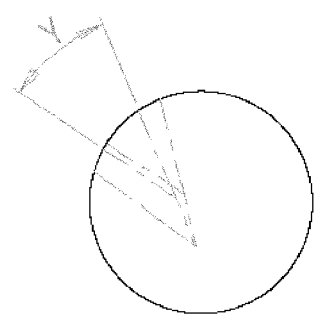
Figure 13:
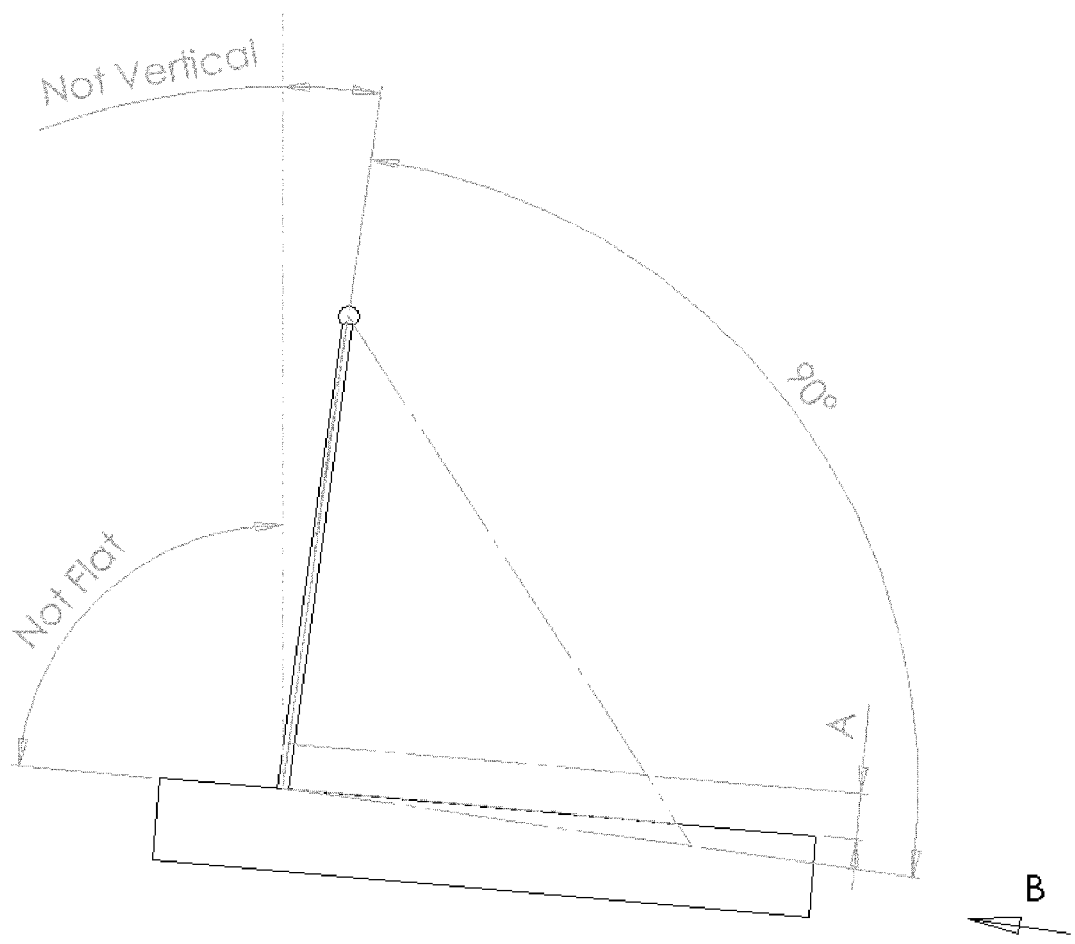
FIG. 13 shows a side view of a device of the invention that is not mounted vertically, showing mathematical variables useful for measuring the surface profile of a crop or pasture growing on a substrate.
Figure 14:
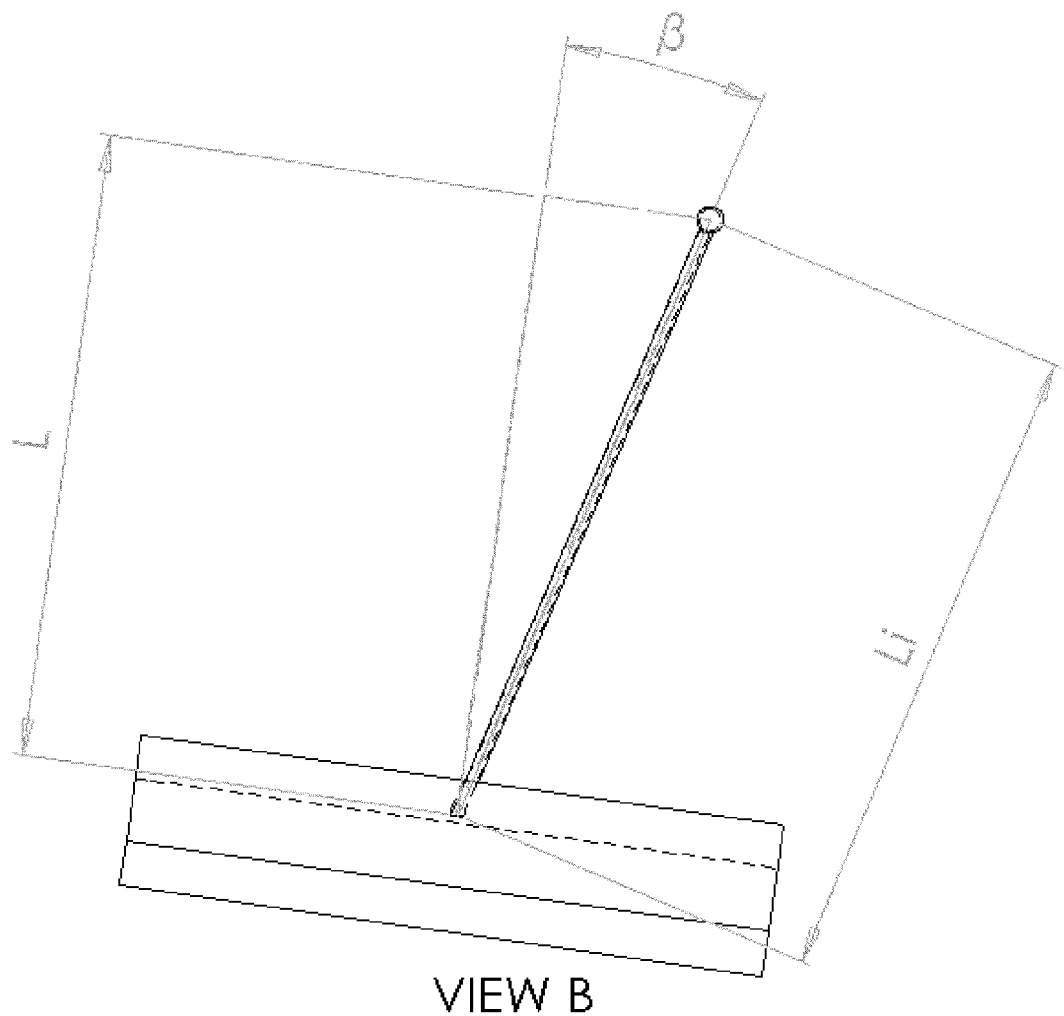
FIG. 14 shows an end view of a device of the invention that is not mounted vertically, showing mathematical variables useful for measuring the surface profile of the canopy of a crop or pasture growing on a substrate.
Figure 15:
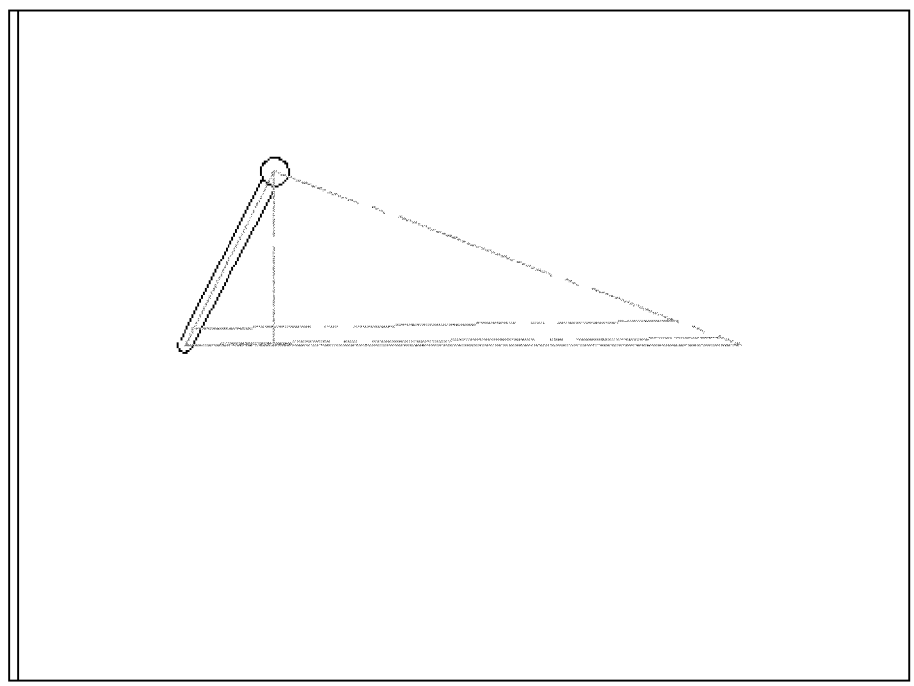
FIG. 15 shows a plan view of a device of the invention that is not mounted vertically, showing the field of view.

Referring to FIGS. 10 and 11, where the device of the invention is mounted vertically, the surface profile of the canopy of a crop or pasture growing on a substrate can be measured by first calculating the angle of incidence from the centre axis of the field of view to the ground during calibration. To do this, the distance to the ground (with the support member vertical) is measured without the crop or pasture present (including in a post-grazing state where grazing stubble remains which may be of the order of approximately 7 cm for ryegrass/clover pasture) state:

$$\tan\gamma_v = \frac{Li \times \sin\theta i}{Di - Li \times \cos\theta i}$$

$$\gamma_v = \tan^{-1}\left(\frac{Li \times \sin\theta i}{Di - Li \times \cos\theta i}\right)$$

Where:

$\gamma_v$=angle from the ground to the centre axis of the detector array of the sensor when the support member is vertical Li=is the length of the support member $\theta i$=the fixed angle between the support member and the centre axis of the sensor field of view Di=the average distance measured to the ground during calibration Once the crop or pasture has grown, the average distance to the canopy is measured to determine the average height/density:

$$A = \sin \gamma_v \times (Di-D)$$

Therefore:

$$A = \sin\left(\tan^{-1}\left(\frac{Li \times \sin\theta i}{Di - Li \times \cos\theta i}\right)\right) \times (Di - D)$$

Where:

A=the average height/density of the crop or pasture

D=the average distance measured to the top surface of the crop or pasture

Referring to FIGS. 12 to 15, where the device of the invention is mounted at an angle to the vertical, the surface profile of the canopy of a crop or pasture growing on a substrate can be measured by appreciating the influence that this displacement from the vertical has on Li, $\theta i$, and Di and hence $\gamma_v$:

$$L = Li \times \cos\beta$$

$$\theta = \tan^{-1}\left(\frac{\tan\theta i}{\cos\beta}\right)$$

-continued $$\sigma = \sin^{-1}(\sin\beta \times \cos\theta i)$$

$$Dc = Di \times \cos\sigma$$

Therefore:

$$\gamma = \tan^{-1}\left(\frac{L \times \sin\theta}{Dc - L \times \cos}\right)$$

Where:
γ=angle from the ground to the centre axis of the sensor field of view
β=the angular displacement from vertical at the time of calibration and measurement (in the direction perpendicular to the plane of measurement)
L=is the adjusted length of the support member
θ=the adjusted angle between the support member and the centre axis of the sensor field of view
σ=the correction angle for the distance measurement
Dc=the adjusted distance to the ground measured during calibration Once the crop or pasture has grown, the average distance to the canopy is measured to determine the average height/density:

$$A = \sin\gamma \times (Di-D) \times \cos\sigma$$

Therefore:

$$A = \sin\left(\tan^{-1}\left(\frac{L \times \sin\theta}{Dc - L \times \cos}\right)\right) \times (Di - D) \times \cos\sigma.$$

It is believed that the thickness or density of the foliage will influence the measured average height, which can be advantageous. In particular, it is believed that the most useful information provided by the products and methods of the invention is the amount of crop or pasture (kg/ha), which can be correlated from the average crop or pasture height. For example, a thin tall crop may measure the same as a short thick crop since the transmitted light is capable of penetrating the outer extremities of the thin tall crop and become incident on the stalk, etc lower down the plant profile. Nonetheless, such measurements are likely to reflect the similar dry weight of the two plant profiles and therefore, this method could improve the accuracy of the device for predicting the amount of crop or pasture.

In some embodiments, the detector array (and hence field of view) can be segmented/sectioned into different zones of measurement, which may provide the advantage of being able to detect significant high or low points in the canopy of the crop or pasture which would otherwise adversely affect the average measurement.

A further advantageous feature of the invention is the ability to account for visual interference:
between the light transmission member and the canopy of the crop or pasture; and/or
between the canopy of the crop or pasture and the light detection sensor.

By virtue of the agricultural environment in which the devices of the invention are located, it is not uncommon for insects or spiders to locate themselves on the sensor member so as to partially block the field of view. This blockage can affect the accuracy of the measurement of the surface profile of the crop or pasture. Temporary blockages may include insects crawling over the outside of the sensor member or dust particles settling on the sensor member that are subsequently blown away in the wind. Permanent blockages (in that they need to be removed during device cleaning or maintenance) may include spiders webs, mud, or excrement from an insect or farm animal.

Some off-the-shelf ToF sensor devices can account for such irregularities, however in the current application, due to the field of view of the sensor being at an angle to the target area (typically 45 deg), the resulting measurement using the in-built capabilities of the ToF sensor may be skewed and therefore inaccurate.

For example, if the blockage is at the base of the sensor cover (which would normally measure a region of the field of view closest to the sensor) it will cause the measurement to be skewed too high (or long). This would cause the pasture or forage crop profile measurement to be calculated to be shorter than it is. Conversely, if the blockage is at the upper extremity of the sensor cover (which would normally measure a region of the field of view furthest to the sensor) it will cause the measurement to be skewed too short. This would cause the crop or pasture surface profile measurement to be calculated to be longer than it is.

So long as the blockages do not completely cover the sensor member's field of view, the invention can account for the blockage and still calculate the surface profile of the crop or pasture behind the blockage, as a method has been devised of separating the false, near-field reading (attributed to the partial blockage) from the target reading.

The solution to this issue provided by the present invention involves a method of scanning through sub-sections of the field of view to detect where the blockage to the field of view occurs, and then use this information to correct the measurements.

Depending on the sensor performance, the following represent two non-limiting options for conducting this blockage-correction method:

1. In embodiments where the light detector sensor detects a strong signal and low noise, the method includes the following steps:
    1. Divide the full area of the detector array (and hence field of view) is into smaller sections (such as 2×2, 3×3, or 4×4);
    2. Measure the surface profile of the crop or pasture in each of the smaller sections;
    3. Ignore any measurements that have anomalous readings created by blockages;
    4. Calculate the distance and angle from each subsection to the target;
    5. Derive a crop or pasture surface profile for each section that is not blocked; and
    6. Average the crop or pasture surface profile for each section that is not blocked to get a surface profile for the full field of view, that has been corrected to ignore the blocked sections.
2. In embodiments where the light detector sensor does not detect a strong signal and low noise an alternative approach includes the following steps:
    1. Calculate the crop or pasture surface profile over the full field of view;
    2. If the surface profile is shorter than expected owing to the presence of a blockage, then divide the sensor area of the detector array into two (or more) smaller sections;
    3. Measure the surface profile for the field of view for each of the smaller sections;

4. If either (or any) of the smaller sections generate anomalous readings created by blockages then split those smaller sections into two (or more) smaller sections, otherwise proceed to step (7);
5. Repeat steps 3-4 until the smallest sections with blockages have been generated;
6. Measure the surface profile of the crop or pasture in each of the smaller sections;
7. Ignore any measurements that have anomalous readings created by blockages;
8. Calculate the distance and angle from each subsection to the target;
9. Derive a crop or pasture surface profile for each section that is not blocked; and
10. Average the crop or pasture surface profile for each section that is not blocked to get a surface profile for the full field of view, that has been corrected to ignore the blocked sections.

In some cases, it may not be possible to obtain a long-range measurement from a sub section of the sensing area due to background noise or other performance factors. In such cases, it is preferable to first get one reading for the profile height from the entirety of the sensing area is used and then scan through a matrix of sub areas until the ones with blockages are found.

Once the projected area of blocked subsection is removed from the projected area from an unblocked sensor, the position of the centre of the remaining area of measurement can be calculated, then the angle to it and hence the corrected pasture profile height.

In preferred embodiments, the blockage-correction method can be re-run after a suitable time to determine if the blockage has moved or is moving.

In preferred embodiments, the device is provided with an alert means that senses a complete blockage of the sensor member and alerts the user so that the blockage may be manually cleared.

In preferred embodiments, the products and methods of the invention are used at night, to reduce interference from sunlight. Nonetheless, the device may further include a means of obtaining and storing energy, such as solar and/or wind energy.

DETAILED DESCRIPTION OF THE INVENTION

FIG. 1 shows a side view of a device (2) of the invention mounted to a substrate (4). The device includes a sensor member (6) coupled to a support member (8). The support member (8) spaces the sensor member (6) a first distance above the substrate. The substrate (4) in FIG. 1 is shown devoid of any crop or pasture for clarity, although it will be understood that the device is intended the measure the surface profile of the canopy of such a crop or pasture. The device (2) may be oriented substantially perpendicular to the slope of the substrate at the base of the support member as shown in FIG. 1. Where the slope of the substrate varies, the device (2) may be oriented substantially perpendicular to the average slope of the substrate in a given area, such as the average slope of the substrate in the area to be sensed by the device. Where the substrate is horizontal such as shown in FIG. 1, the device may therefore be mounted substantially vertically. Nonetheless, the device does not need to be oriented either substantially perpendicular to the substrate nor does the device need to be oriented substantially vertically. Advantageously, the angle of the device to the vertical can be determined using a number of methods including the use of an accelerometer. For example, the accelerometer may be single or multi-axis to detect the direction of the proper acceleration due to gravity as a vector, and hence give the angle of the device to the vertical. Allowance made for this angle in calculating the crop or pasture height; crop or pasture density; and/or crop or pasture dry mass content.

Figure 2:
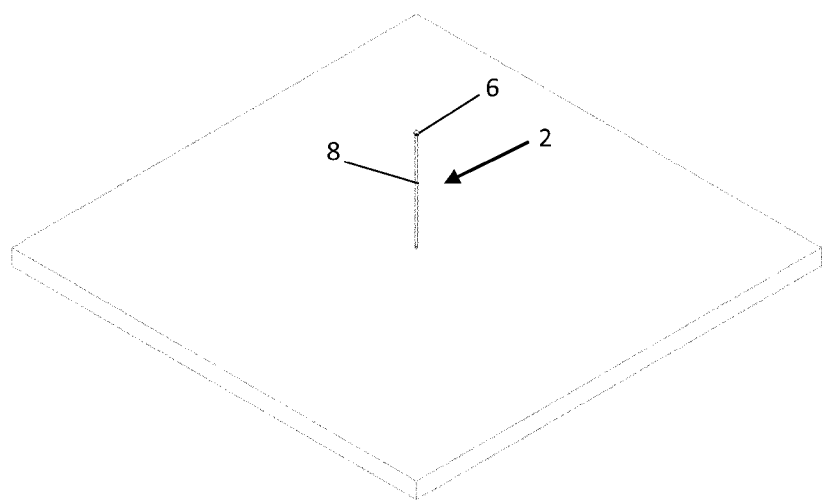
FIG. 2 shows a perspective view of a device of the invention mounted to a substrate.

FIG. 2 shows a perspective view of the device (2) shown in FIG. 1, including a sensor member (6) coupled to a support member (8). In preferred embodiments the device has a minimalist profile so as to cast a minimalist shadow so as not to inhibit crop or pasture growth. Such a minimalist profile may be provided by an elongate pole having width and/or depth dimensions that are only as wide as necessary to maintain the sensor member spaced the first distance above the substrate. A minimalist profile also provides minimal disruption to grazing animals.

Figure 3:
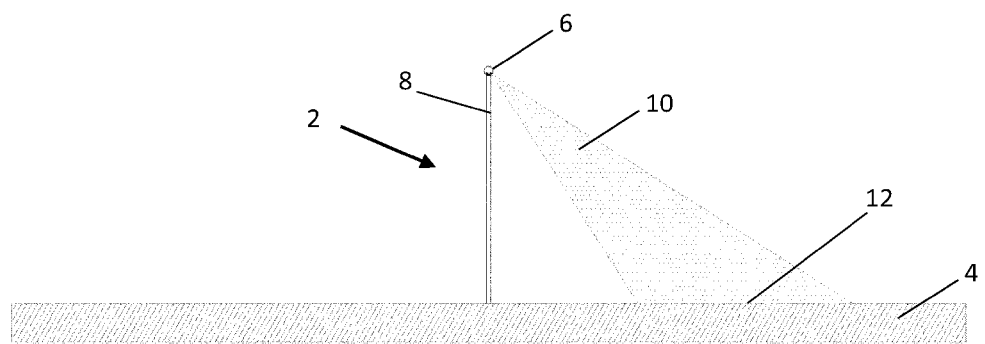
FIG. 3 shows a side view of a device of the invention mounted to a substrate.
Figure 4:
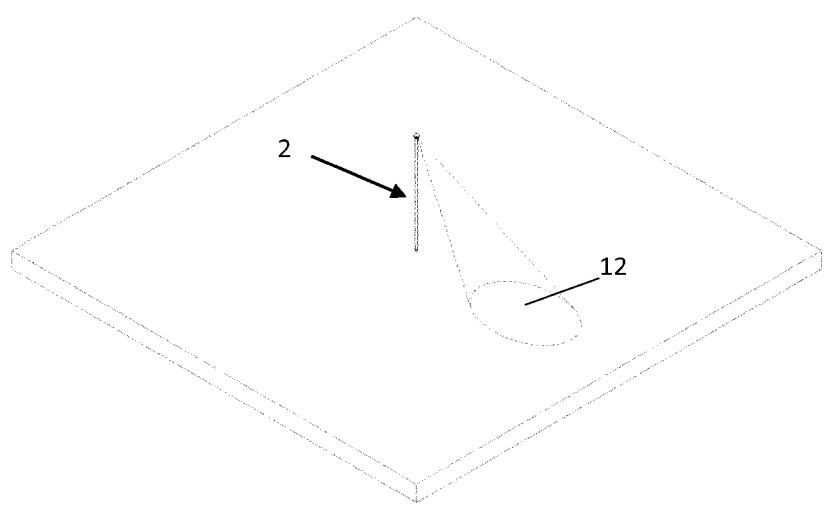
FIG. 4 shows a perspective view of a device of the invention mounted to a substrate.

FIG. 3 shows a side view of a device (2) of the invention mounted to a substrate (4), and FIG. 4 shows a perspective view of the same device (2). The device (2) includes a sensor member (6) coupled to a support member (8). The sensor member (6) includes a sensor configured to detect light (10) transmitted from the sensor member so as to enable the measurement of the surface profile of the canopy of the crop or pasture. Whilst the substrate (4) in FIG. 1 is shown devoid of any crop or pasture for clarity, it will be understood that the device is intended the measure the surface profile of the canopy of such a crop or pasture. Furthermore, it will be understood that the substrate height represents for example, a freshly sown substrate. The light (8) transmitted from the sensor member will fall incident on the substrate over a field of view (12). A portion of the transmitted light will reflect back in the direction of the sensor member and fall incident on the sensor included in the sensor member (6). In preferred embodiments, that reflected light can be analysed to provide a statistical distribution of the distance from the sensor member (6) to the field of view (12) being measured. In some embodiments, the field of view (12) will be uniform in profile, however typically the field of view (12) will represent the canopy of a crop or pasture growing on a substrate and will not be uniform in profile. In such embodiments, the profile may include regions that are significantly closer to the substrate than others. For example, where the crop or pasture is sparsely planted the transmitted light may fall incident on each of: the substrate; a stem/stalk of the plant; and a leaf/flower of the crop or pasture. Advantageously, the device of the invention preferably measures the reflected light over a field of view (12) and provides an average (such as mean or median) crop or pasture height; crop or pasture density; and/or crop or pasture dry mass content) within that field of view.

Figure 5:
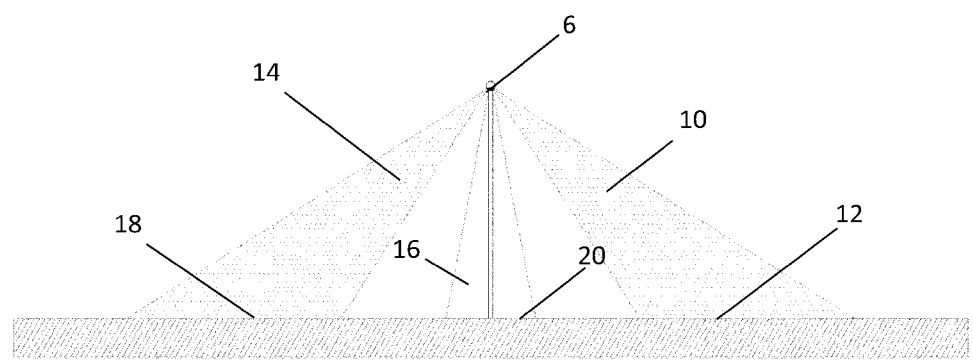
FIG. 5 shows a side view of a device of the invention mounted to a substrate.
Figure 6:
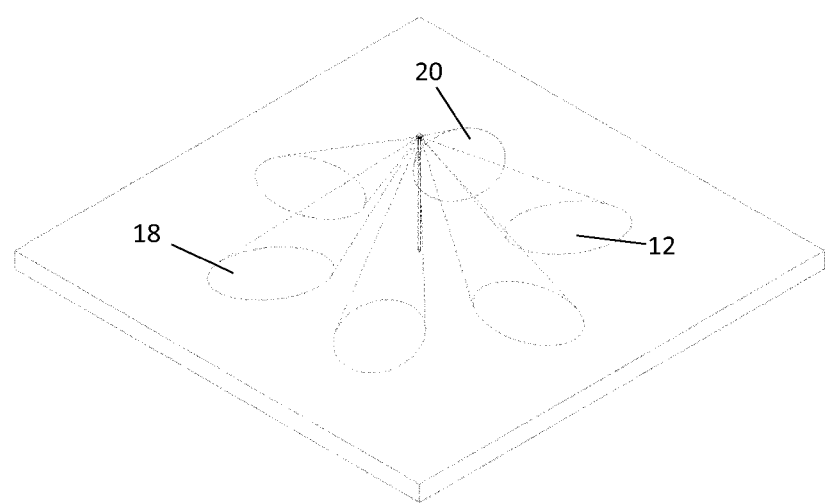
FIG. 6 shows a perspective view of a device of the invention mounted to a substrate.

The accuracy of the surface profile measurement (and hence the crop or pasture height; crop or pasture density; and/or crop or pasture dry mass content) is further enhanced when the sensor member (6) includes a plurality of sensors, such as a multitude of sensors. As shown in side view in FIG. 5, and in perspective view in FIG. 6, the sensor member (6) may be configured to detect light (10, 14, 16) transmitted from a plurality (such as a multitude) of sensors and reflected from a plurality (such as a multitude) of fields of view (12, 18, 20). The use of a sensor member including a plurality (such as a multitude) of sensors is particularly advantageous where the slope of the substrate and/or the profile of the canopy of the crop or pasture is variable, particularly where is it highly variable. FIG. 6 shows that the reflected light (10, 14, 16) is transmitted radially outwardly and towards the substrate from the sensor member.

Figure 7:
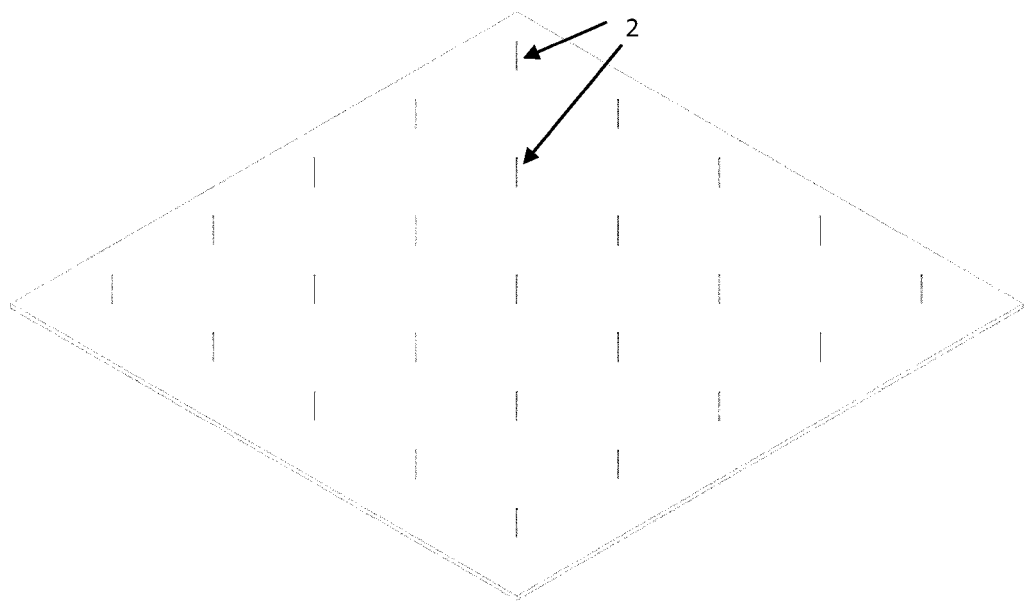
FIG. 7 shows an array of devices of the invention mounted to a substrate in perspective view.
Figure 8:
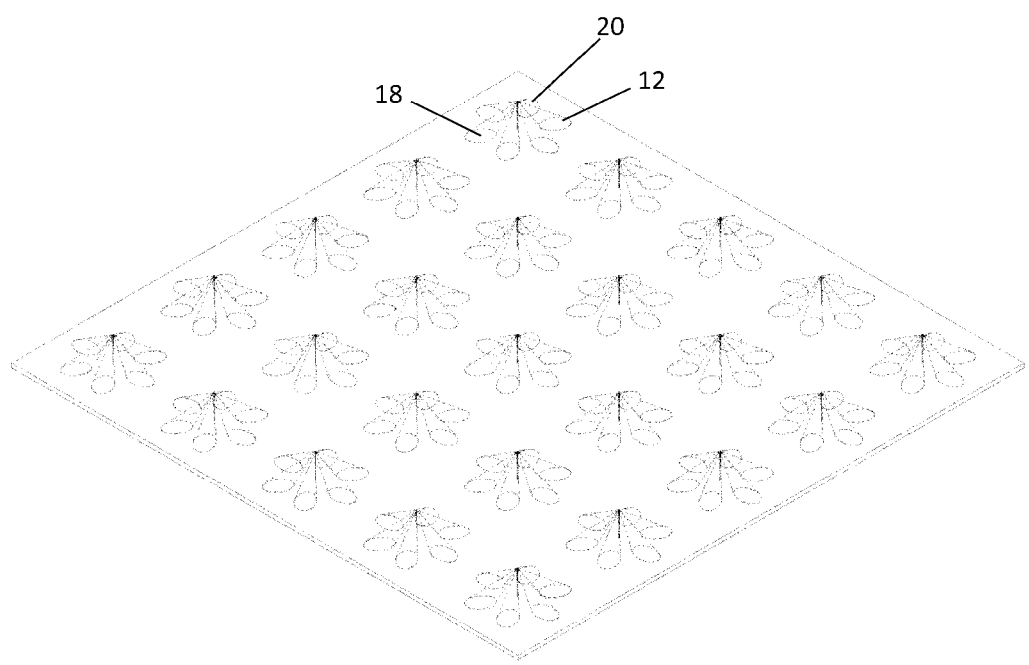
FIG. 8 shows an array of devices of the invention mounted to a substrate in perspective view.

An array of devices (2) of the invention for measuring crop or pasture surface profile (and hence height) over a first field of view is shown in perspective view in FIG. 7. The devices (2) in the array may be arranged in a regular pattern as shown in FIG. 7, but may also be arranged irregularly to take account of other infrastructure on the substrate or known soil profiling. The same array shown in FIG. 7 is shown in FIG. 8 in perspective view demonstrating the amount of information that can be gathered from such an array including the average (such as mean or median) crop or pasture surface profile (and hence height; crop or pasture density; and/or crop or pasture dry mass content) within each of fields of view (12, 18, 20).

Figure 9:
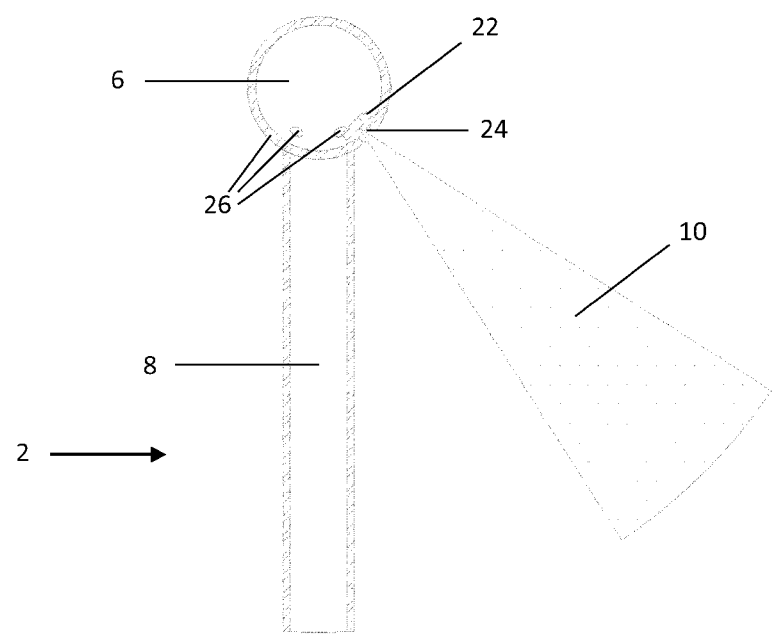
FIG. 9 shows a cut-away representation of a side view of the device of the invention.

FIG. 9 shows a cut-away representation of a side view of the device (2) of the invention. The device includes a sensor member (6) coupled to a support member (8). The sensor member (6) is substantially spherical in shape, although this should not be seen as limiting, and includes: sensor (22; which may include a detector array of a ToF sensor); aperture (24); and a plurality (such as a multitude) of further apertures (26). Light (10) is transmitted from sensor (22) through a light aperture (24) in the sensor member. The light aperture is ideally transparent to at least a portion of the light being transmitted and received and may consist of a transparent solid material, such as glass, quartz or a plastic (such as polycarbonate, polystyrene or an acrylic material) which will inhibit ingress of material into the sensor member during use. Nonetheless, the light aperture may be a hole in the sensor member. The device (2) of FIG. 9 shows only a single sensor (22), although it will be understood that the sensor member may comprise a plurality (such as a multitude) of light apertures (26) each of which may be utilized by corresponding sensors (not shown) in the relationship that sensor (22) has with light aperture (24).

While not shown, the sensor member may also move along the support member (8) so as to vary the spacing (the first distance) between the sensor member (6) and the substrate (4).

While not shown, the sensor in the sensor member may also include a plurality (such as a multitude) of sub-sensors that enable the field of view of the reflected light to be fragmented. Such a plurality (such as a multitude) of sub-sensors may be referred to as a sensor array. The use of a sensor including a plurality (such as a multitude) of sub-sensors is particularly advantageous where the slope of the substrate and/or the profile of the canopy of the crop or pasture is variable, particularly where is it highly variable.

As used herein, the term "plurality" refers to 2 or more. As used herein, the term "multitude" refers to 3 or more, such as 5 or more, such as 10 or more, such as 20 or more.

Figure 16:
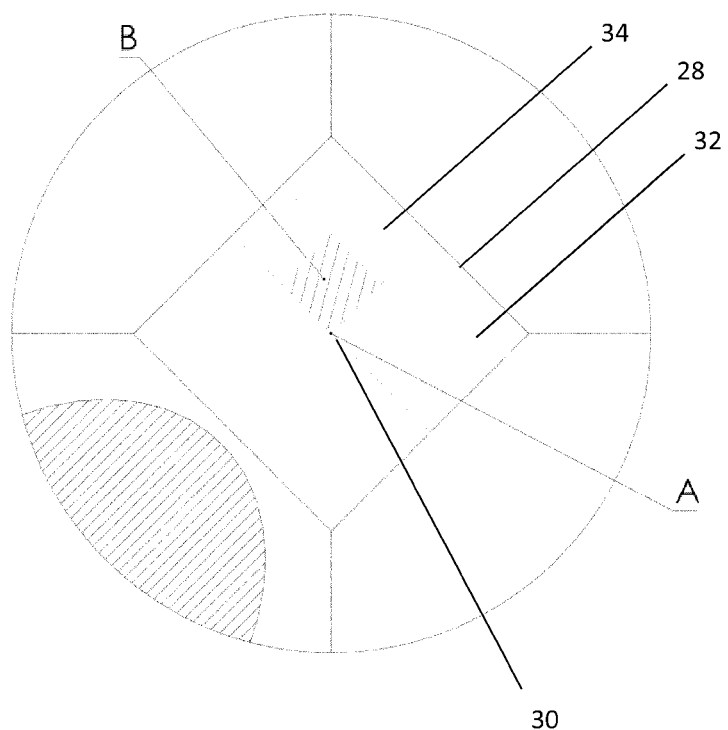
FIG. 16 shows a front view of a detector array (an example of a light detector sensor) within a sensor member of the invention.

FIG. 16 shows a front view of a detector array (an example of a light detector sensor (22; FIG. 9) within a sensor member of the invention. The sensor member in this embodiment includes an integrated unit that integrally includes both a light transmission member and a light detection sensor. The sensor member is provided with a lens (28) having a centre ("A"; 30). In one embodiment, the sensor member is believed to have been partially blocked and a method is run to account for the blockage. In this embodiment the following method is carried out to account for the blockage:

1. The crop or pasture surface profile is calculated over the full field of view by using the entirety of the area of the detector array;
2. The area of the detector array is divided into four (2×2) smaller square sections (32);
3. The field of view is measured for each of the smaller sections;
4. The upper square generates an anomalous reading created by a blockage in square ("B") and so the upper square of the area of the detector array is split into four (2×2) smaller square sections (34);
5. The field of view is measured for each of the smaller sections;
6. The anomalous readings from blacked square ("B") are ignored;
7. The distance and angle from the sensor to each unblocked section on the target is calculated;
8. A crop or pasture surface profile is derived for each unblocked section; and
9. The crop or pasture surface profile for each unblocked section is averaged to get a surface profile for the full field of view, that has been corrected to ignore the blocked sections.

Figure 17:
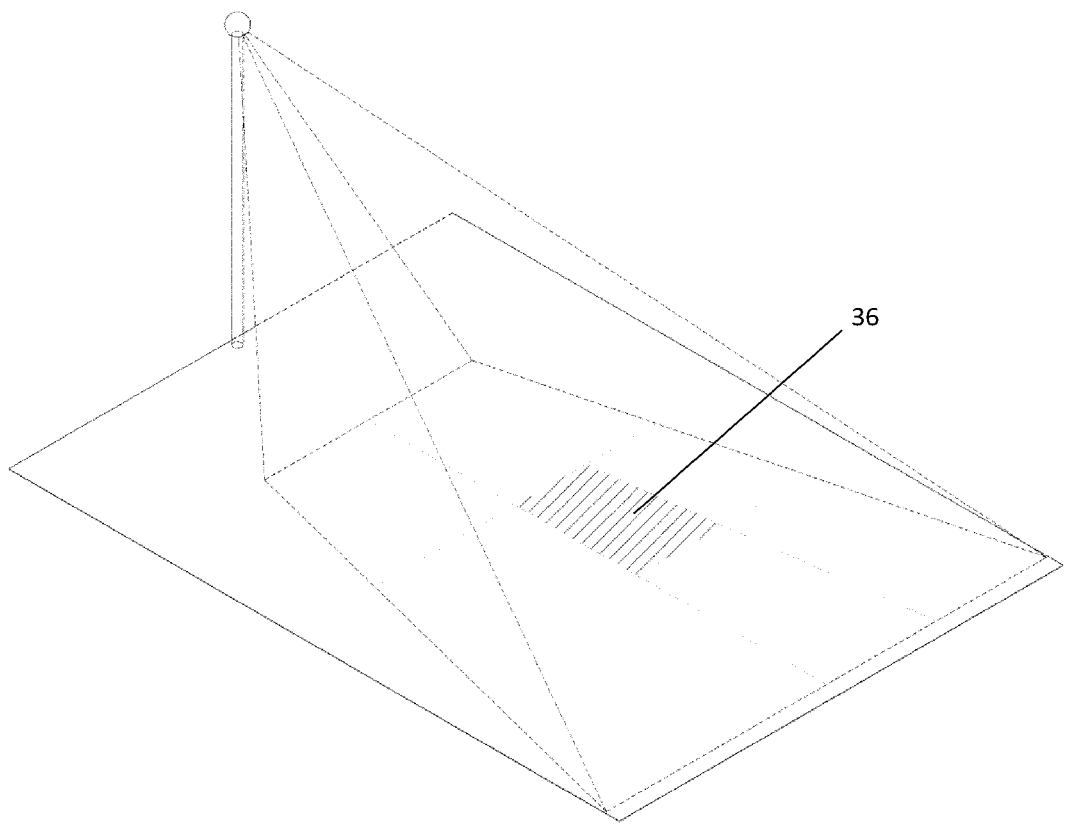
FIG. 17 shows a perspective view of a device of the invention mounted to a substrate, and the field of view of the device bounded by dashed lines. The field of view is sectioned into a number of sub-sections (and further sub-sections within one of those sub-sections)

FIG. 17 shows a perspective view of a device of the invention mounted to a substrate, and the field of view of the device. The field of view has been divided according to the divisions created at the detector array of the sensor and shown in FIG. 16. As can be seen, whilst the area of the detector array is square at the sensor (FIG. 16), because of the angle of the sensor to the substrate/crop/pasture, the field of view is trapezoidal at the substrate/crop/pasture. The blocked section ("B"; 36) is likewise trapezoidal. However, it will be understood that where the surface profile of the crop or pasture is irregular or sloping, then shapes other than trapezoidal fields of view will be observed.

Figure 18:
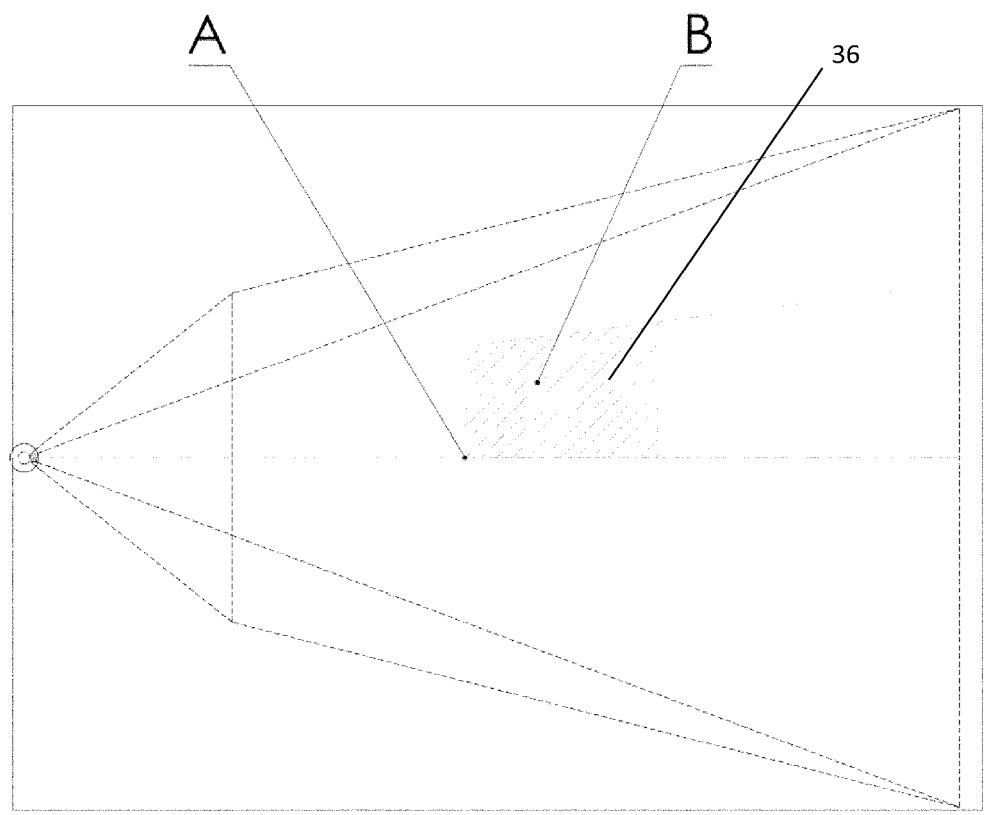
FIG. 18 shows a plan view of a device of the invention mounted to a substrate, and the field of view of the device bounded by dashed lines.
Figure 19:
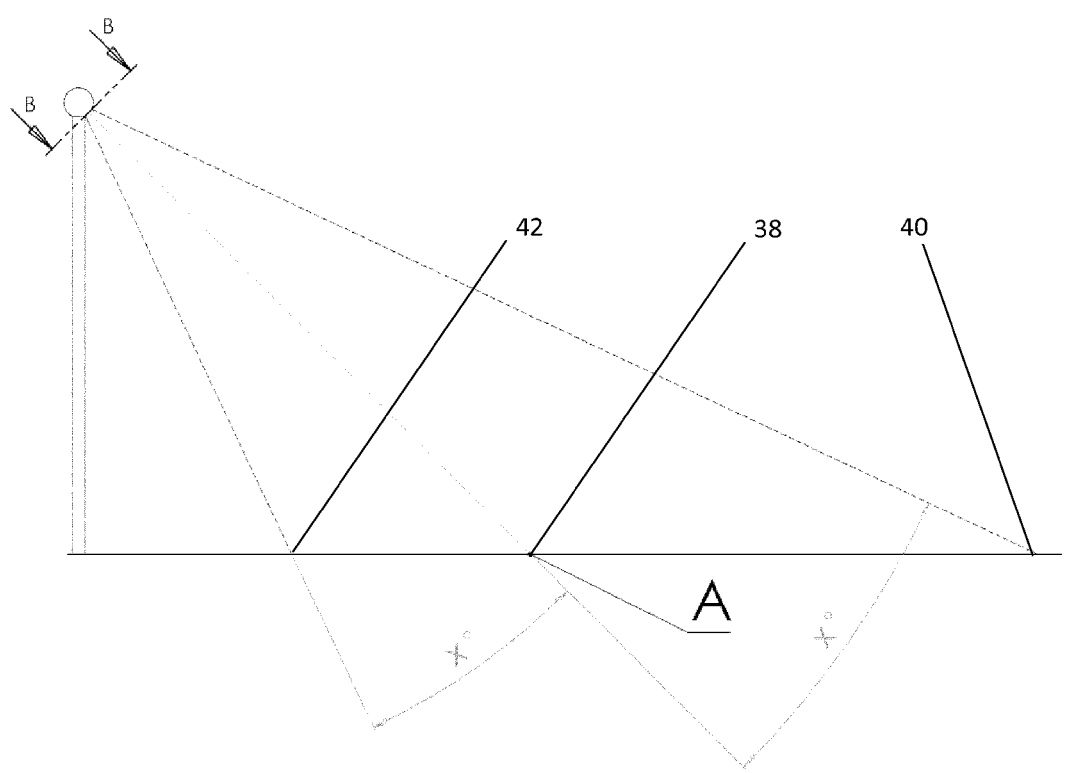
FIG. 19 shows a side view of a device of the invention mounted to a substrate, and the field of view of the device bounded by dashed lines.

FIG. 18 shows a plan view of a device of the invention mounted to a substrate, and the field of view of the device as well as the trapezoidal blocked section (36);

FIG. 19 shows a side view of a device of the invention mounted to a substrate. In this side view, the midpoint of the area of the detector array at the sensor (30 in FIG. 16) projects to point A (38) which is not the midpoint between the extremities (40, 42) of the field of view.

Figure 20:
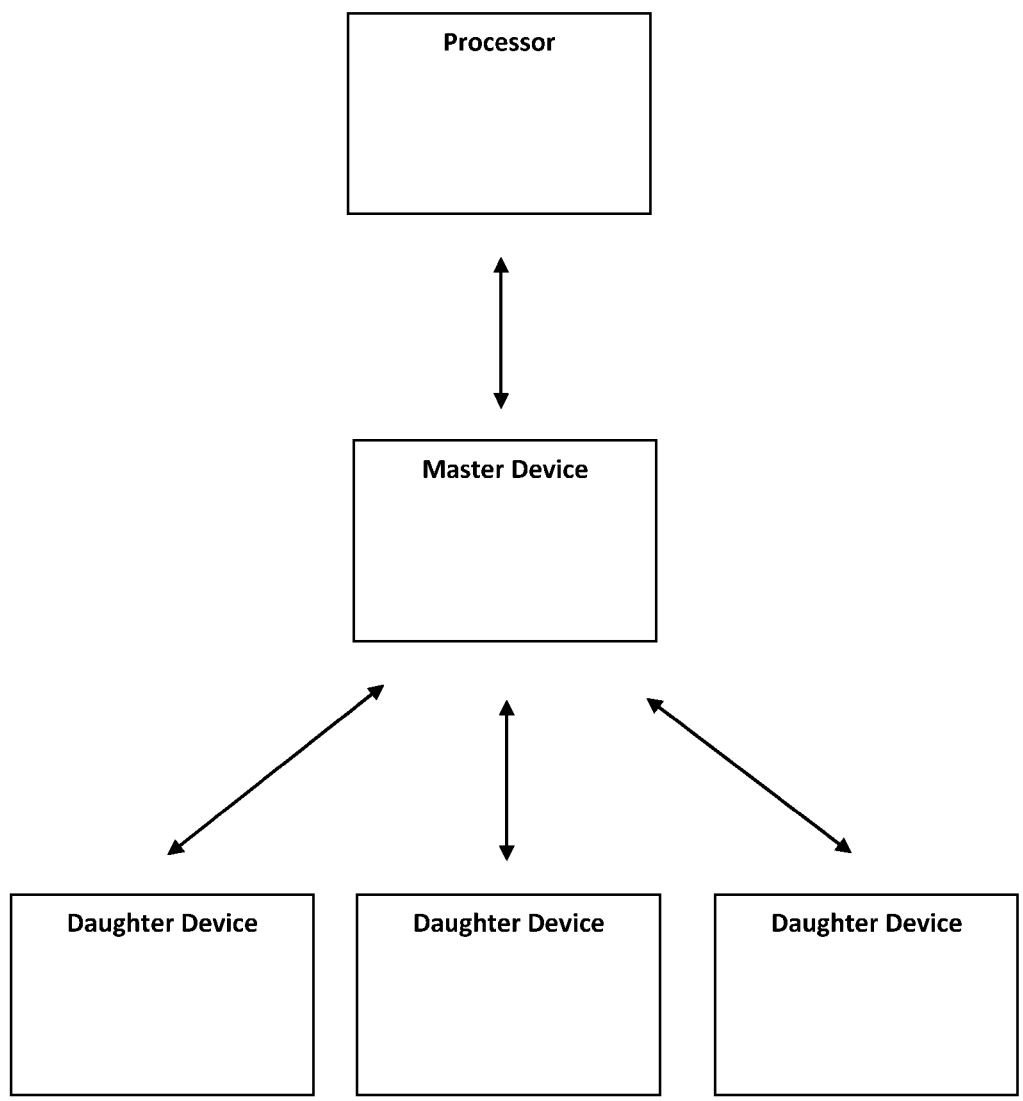
FIG. 20 shows a communication schematic of those embodiments that include a plurality of devices, wherein at least one device is a daughter device and at least one device is a master device and the master device is in communication with a processor.

FIG. 20 shows a communication schematic of those embodiments that include a plurality of devices, wherein at least one device is a daughter device and at least one device is a master device and the master device is in communication with a processor which is separate to the devices. The schematic shows two way communication between each of the daughter devices and the master device. This should not be seen as limiting and only some of the daughter devices may be configured for two-way communication with the master device. In some embodiments the daughter devices only transmit to the master device (one-way communication). In some embodiments the system is provided with a plurality of master devices.

While the schematic shows a single master device, this should not be seen as limiting. Within a farm system, numerous master devices may be employed. Likewise, while the schematic shows a single processor, this should not be seen as limiting. Within a farm system, numerous processors may be employed.

The daughter devices may be located in physical proximity to the Master Device. Where they are located in close physical proximity to the Master Device, the daughter devices may be in communication with the master device by a low power wireless technology (such as Bluetooth). In some embodiments, the master device may not be in close proximity to the processor and so a longer range communication mode can be preferably used, such as Wide Area Network (WAN; including LPWAN such as LoRaWAN), Wireless Local Area Network (WLAN), Wi-Fi, and/or mobile telephony (such as GSM and UMTS). While the invention is described preferably with reference to wireless communication modes, other communication modes including wired communication modes and physical data storage transfer are also envisaged.

Figure 21:
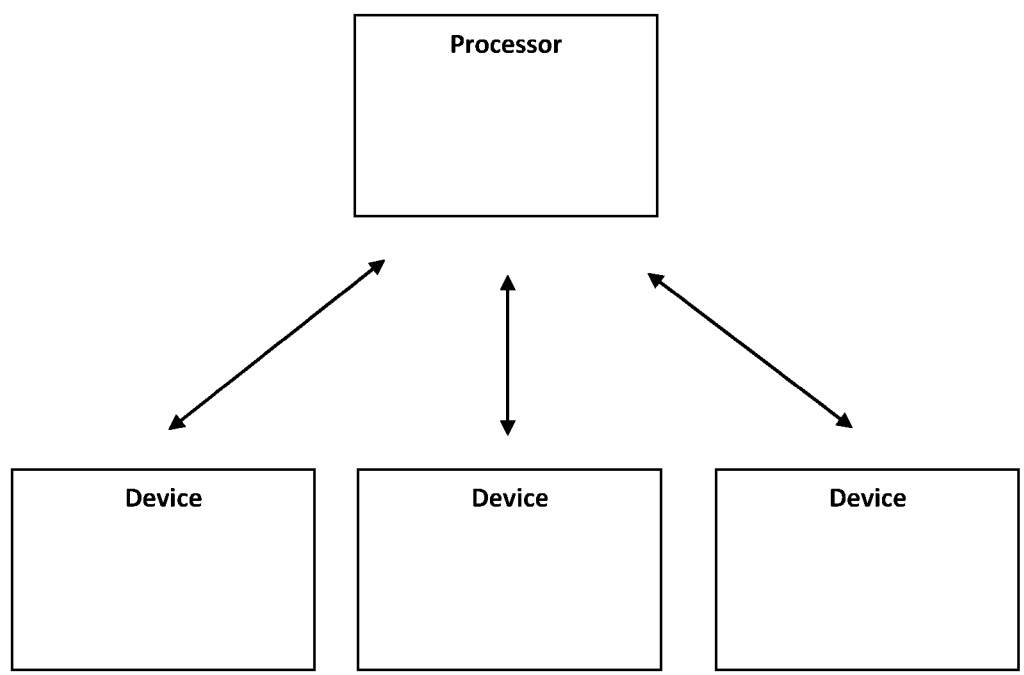
FIG. 21 shows a communication schematic of those embodiments that include a plurality of devices, wherein each device is in communication with a processor.

FIG. 21 shows a communication schematic of those embodiments that include a plurality of devices, wherein each device is in communication with a processor which is separate to the devices. In this embodiment. The schematic shows two way communication between each of the devices and the processor. This should not be seen as limiting and only some of the devices may be configured for two-way communication with the processor. In some embodiments the devices only transmit to the processor (one-way communication). In some embodiments the system is provided with a plurality of master devices. Examples of communication modes are Bluetooth, Wide Area Network (WAN; including LPWAN such as LoRaWAN), Wireless Local Area Network (WLAN), Wi-Fi, and/or mobile telephony (such as GSM and UMTS).

Figure 22:
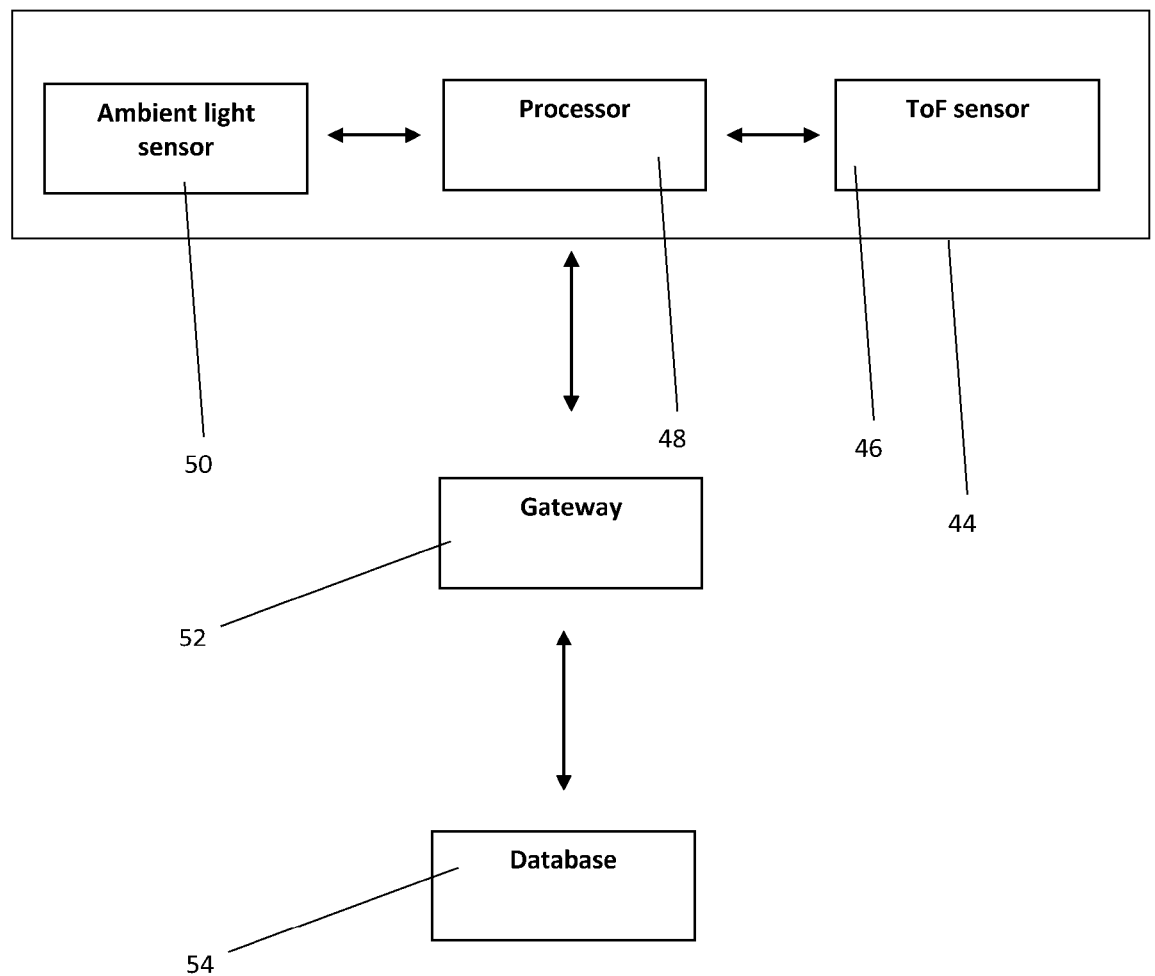
FIG. 22 shows a communication schematic of a preferred system of the invention, incorporating a device (that includes an ambient light sensor, processor and ToF sensor); a telecommunications gateway; and a database.

FIG. 22 shows a communication schematic of a preferred embodiment of the invention. In this embodiment, the device (44) includes a ToF sensor (46), a processor (48) and an ambient light sensor (50). The processor (48) is configured to hibernate in a deep sleep and awake at regular predetermined intervals (such as every 5 minutes) to initiate a data acquisition sequence which engages the ambient light sensor (50). If the data acquired from the ambient light sensor indicates that the ambient light in the vicinity of the device (44) is above a predetermined threshold then the processor (48) will re-enter a deep sleep phase. Advantageously by selectively operating the device when ambient light low levels are below the predetermined threshold (such as low light levels) this feature may provide for the use of a low powered sensor suitable for a remote, battery powered device. If the data acquired from the ambient light sensor indicates that the ambient light in the vicinity of the device (44) is below a predetermined threshold then the processor (48) is configured to initiate a data acquisition sequence which engages the ToF sensor (46) and will initiate that sequence. The ToF sensor data acquisition sequence may involve acquiring 50 measurements from each sensor. To that end, while the communication schematic is shown with only one ToF sensor, this should not be seen as limiting and the device may incorporate a plurality or even multitude of ToF sensors—such as 6 sensors. The device may further incorporate GNSS (Global Navigation Satellite System; such as GPS) modules that can be incorporated to collect positional data and package that positional data with surface profile data. The data acquired from the (or each) ToF sensor may include average measurements of surface profile, as well as maximum and minimum surface profile positions. The processor may create events using a time stamp and the event data acquired may be sent in packaged and/or encrypted state to a gateway telecommunication device (52). The gateway telecommunication device (52) may then perform further unpackaging, packaging, and/or encryption processes on the event data before that data is sent to a database server which includes a database (54). The database may be cloud-based for ease of user access.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

The "device" (for measuring the surface profile of the canopy of a crop or pasture growing on a substrate) referred to herein may also be referred to as the "crop or pasture canopy surface profile measuring device".

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

The invention claimed is:

1. Device for measuring the surface profile of the canopy of a crop or pasture growing on a substrate, the device including a sensor member coupled to a support member that is configured to detachably mount to the substrate and be fixed to the substrate at the time of measurement, wherein the support member is configured to:
   i) space the sensor member above the substrate by a first distance; and
   ii) space the sensor member above the canopy of the crop or pasture by a second distance;
   and wherein the sensor member:
   i) includes a light transmission member that is configured to transmit light which is reflected by the canopy of the crop or pasture; and
   ii) includes a light detection sensor that is configured to detect at least a portion of the light transmitted from the light transmission member that is reflected by the canopy of the crop or pasture so as to enable the measurement of the surface profile of the canopy of the crop or pasture.

2. The device according to claim 1 wherein the measurement of the surface profile of the canopy is used to calculate:
   crop or pasture height;
   crop or pasture density;
   crop or pasture metabolizable energy (ME); and/or
   crop or pasture dry mass content.

3. The device according to claim 1 wherein the sensor member includes a plurality of light transmission members.

4. The device according to claim 3 wherein the light transmission members are oriented to transmit light radially outward from the sensor member at a range of angles to the vertical, horizontal, average slope of the substrate and/or average slope of the canopy of the crop or pasture.

5. The device according to claim 1 wherein the sensor member includes a plurality of light detection sensors.

6. The device according to claim 1 further including a radio communication transmitter of at least one of Bluetooth, Wide Area Network, Wireless Local Area Network, Wi-Fi, and/or mobile telephony.

7. System for measuring the surface profile of the canopy of a crop or pasture growing on a substrate, the system including:

a) a device for measuring the surface profile of the canopy of a crop or pasture growing on a substrate, the device including a sensor member coupled to a support member that is configured to detachably mount to the substrate and be fixed to the substrate at the time of measurement, wherein the support member is configured to:
- (i) space the sensor member above the substrate by a first distance; and
- (ii) space the sensor member above the canopy of the crop or pasture by a second distance;

and wherein the sensor member:
- (i) includes a light transmission member that is configured to transmit light which is reflected by the canopy of the crop or pasture; and
- (ii) includes a light detection sensor that is configured to detect at least a portion of the light transmitted from the light transmission member that is reflected by the canopy of the crop or pasture so as to enable the measurement of the surface profile of the canopy of the crop or pasture; and b) a processor separate from the device.

8. The system according to claim 7 wherein the device further includes a radio communication transmitter of at least one of Bluetooth, Wide Area Network, Wireless Local Area Network, Wi-Fi, and/or mobile telephony.

9. The system according to claim 7 wherein the system includes a plurality of devices for measuring the surface profile of the canopy of a crop or pasture growing on a substrate.

10. The system according to claim 7 wherein at least one device is a master device and at least one device is a daughter device, wherein the daughter device is in communication with the master device and the master device is in communication with the daughter device and the processor.

11. An array of devices for measuring the surface profile of the canopy of the crop or pasture over a multitude of areas, the array including a multitude of devices for measuring the surface profile of the canopy of a crop or pasture growing on a substrate, each of the multitude of devices independently including a sensor member coupled to a support member that is configured to detachably mount to the substrate and be fixed to the substrate at the time of measurement, wherein the support member is configured to:
- (i) space the sensor member above the substrate by a first distance; and
- (ii) space the sensor member above the canopy of the crop or pasture by a second distance;

and where the sensor member includes a sensor configured to detect light transmitted from the sensor member so as to enable the measurement of the surface profile of the canopy of the crop or pasture.

12. The array according to claim 11 wherein the devices in the array provide overlapping regions of measurement.

13. A method of measuring the surface profile of the canopy of a crop or pasture growing on a substrate, the method including the steps of:
- i) providing a sensor member that is detachably mounted to the substrate and is fixed to the substrate at the time of measurement, the sensor member including:
  - a) a light transmission member that is configured to transmit light; and
  - b) a light detection sensor;
- ii) transmitting light from the light transmission member so that the light is reflected by the canopy of the crop or pasture;
- iii) detecting at least a portion of the transmitted light that is reflected by the canopy of the crop or pasture using the light detection sensor; and
- iv) calculating the spatial relationship between the sensor member and the canopy of the crop or pasture.

14. The method according to claim 13 the method further including a calibration step to determine the spatial relationship between the sensor member and the substrate.

15. The method according to claim 14 wherein the calibration step comprises:
- i) providing a sensor member including:
  - a) a light transmission member that is configured to transmit light; and
  - b) a light detection sensor;
- ii) transmitting light from the light transmission member so that the light is reflected by the substrate;
- iii) detecting at least a portion of the transmitted light that is reflected by the substrate using the light detection sensor; and
- iv) calculating the spatial relationship between the sensor member and the substrate.

16. A method of measuring the surface profile of the canopy of a crop or pasture growing on a substrate, the method including the steps of:
- i) providing a sensor member that is detachably mounted to the substrate and is fixed to the substrate at the time of measurement, the sensor member including:
  - a) a light transmission member that is configured to transmit light; and
  - b) a light detection sensor;
- ii) transmitting light from the light transmission member so that the light is reflected by the substrate;
- iii) detecting at least a portion of the transmitted light that is reflected by the substrate using the light detection sensor;
- iv) calculating the spatial relationship between the sensor member and the substrate;
- v) transmitting light from the light transmission member so that the light is reflected by the canopy of the crop or pasture;
- vi) detecting at least a portion of the transmitted light that is reflected by the canopy of the crop or pasture using the light detection sensor; and
- vii) calculating the spatial relationship between the sensor member and the canopy of the crop or pasture.

17. The method of claim 16 including performing a blockage-correction method.

18. The method of claim 17 wherein the blockage-correction method includes the steps of:
- i) scanning through sub-sections of the field of view to detect where the blockage to the field of view occurs; and
- ii) ignoring data from those sub-sections.

19. The method of claim 17 wherein the blockage-correction method includes the steps of:
- i) provide a sensor member having a detector array and divide the area of the detector array into smaller sections;
- ii) measure the surface profile of the crop or pasture in each of the smaller sections;
- iii) ignore any measurements that have anomalous readings created by blockages;
- iv) calculate the distance and angle from each subsection to the target;
- v) derive a crop or pasture surface profile for each section that is not blocked; and vi) average the crop or pasture surface profile for each section that is not blocked to get a surface profile for the full field of view, that has been corrected to ignore the blocked sections.

20. The method of claim 17 wherein the blockage-correction method includes the steps of:
   i) calculate the crop or pasture surface profile over the full field of view;
   ii) if the surface profile is shorter than expected owing to the presence of a blockage, then divide the sensor area of the detector array into two or more smaller sections;
   iii) measure the field of view for each of the smaller sections;
   iv) if either or any of the smaller sections generate anomalous readings created by blockages then split those smaller sections into two or more smaller sections, otherwise proceed to step (vii);
   v) repeat steps (iii)-(iv) until the smallest sections with blockages have been generated;
   vi) measure the surface profile of the crop or pasture in each of the smaller sections;
   vii) ignore any measurements that have anomalous readings created by blockages;
   viii) calculate the distance and angle from each subsection to the target;
   ix) derive a crop or pasture surface profile for each section that is not blocked; and
   x) average the crop or pasture surface profile for each section that is not blocked to get a surface profile for the full field of view, that has been corrected to ignore the blocked sections.

* * * * *